United States Patent [19]
Popkin

[11] 4,090,035
[45] May 16, 1978

[54] LINE ACCESS MODULE
[75] Inventor: Philip Popkin, Orange County, Fla.
[73] Assignee: Martin Marietta Corporation, Orlando, Fla.
[21] Appl. No.: 725,308
[22] Filed: Sep. 21, 1976

Related U.S. Application Data
[63] Continuation-in-part of Ser. No. 641,712, Dec. 17, 1975, abandoned.

[51] Int. Cl.² ............................................. H04J 3/08
[52] U.S. Cl. ........................ 179/15 BO; 179/15 AL
[58] Field of Search ........ 179/15 BD, 15 AL, 15 BF, 179/15 A, 175.35; 178/2 C, 58 R, 58 A, 59, 69 R, 69 G; 343/175, 177; 333/7 R, 7 D, 8, 22 R

[56] References Cited
U.S. PATENT DOCUMENTS

| | | | |
|---|---|---|---|
| 3,054,859 | 9/1962 | Brown | 179/15 BD |
| 3,730,993 | 5/1973 | Moriyasu | 178/59 |
| 3,768,041 | 10/1973 | Carlise | 333/7 D |
| 3,823,269 | 7/1974 | Saito | 179/15 BF |
| 3,838,416 | 9/1974 | Brown | 179/15 BD |
| 4,002,842 | 1/1977 | Meyr | 179/15 AL |

Primary Examiner—David L. Stewart
Attorney, Agent, or Firm—Julian C. Renfro; Gay Chin

[57] ABSTRACT

A device for permanent installation in series with a time division multiplex digital data transmission line for accessing data signals carried by the line without interruption or degradation of the signals. The device, referred to as a line access module (LAM), operates in a throughput mode in which incoming signals pass through the device without modification and a bypass mode in which the incoming signals are bypassed to an external common electronics circuit and reinserted in the outgoing transmission line. The LAM includes a controllable electronic switch for breaking the normal data signal throughput of the transmission line, for terminating the incoming line, and for bypassing the incoming data signals to the external common electronics circuits; a data insertion circuit for receiving the bypassed data signals from the common electronics circuits and transmitting these signals over the outgoing transmission line; and a delay circuit in the normal data signal throughput path for equalizing the transit time of data signals through the LAM in the normal throughput mode and in the bypass mode. A principal application of the LAM is as an element in a test system for verifying the integrity of individual subscriber channels of the digital data bit stream. The common electronics circuits generally include means for recognizing the framing pattern of a designated data subscriber channel, and for selectively deleting the incoming data content of the designated channel, and inserting locally generated data such as a test code in place thereof for transmission over the outgoing transmission line. Through the use of a duplex arrangement having a LAM in both the SEND and RECEIVE transmission lines, the response to the inserted test code data in the SEND line can be extracted from the RECEIVE line and decoded. In a system having a multiplicity of transmission lines, a LAM is installed in each line and all are controlled by a single common electronics circuit which may include a computer. Accessing an individual channel of the data bit stream is accomplished without interruption or degradation of the other subscriber channels.

18 Claims, 11 Drawing Figures

LINE ACCESS MODULE

This application is a continuation-in-part of copending U.S. Pat. application Ser. No. 641,712 filed on Dec. 17, 1975 assigned to the assignee of the present invention, and now abandoned.

BACKGROUND OF THE INVENTION

1. Field of the Invention

The present invention generally relates to time division multiplex (TDM) data transmission systems, and more particularly to a device and method for selectively obtaining access to individual channels of a TDM bit stream without de-multiplexing thereof, principally to allow testing of such channels.

2. Description of the Prior Art

In the operation of digital transmission systems, it is the practice to multiplex large numbers of subscriber data channels into one high-speed digital bit stream and to transmit the bit stream over various transmission media such as cable and radio. Normally, the bit stream may pass through central offices, relay terminals, and transmission equipment without de-multiplex of the bit stream being necessary. However, to assure the proper operation of the subscriber end equipment and transmission paths, it is necessary to selectively monitor and periodically test subscriber equipment from central offices.

Prior art subscriber channel testing has been limited to points at which physical access to the individual subscriber lines is possible. In this practice demultiplex equipment is necessary, manual connections of test equipment to each line to be tested is required, and time-consuming research of network and routing records is required to determine the location of the access points.

SUMMARY OF THE INVENTION

The present invention is a device installable in series relation in the digital data transmission system which is carrying a time division multiplex data bit stream, and will allow electrical access to any individual subscriber channel of the bit stream. Termed a line access module (LAM), the device is normally in an unpowered mode or state and transparent to the throughput passage of the data bit stream on the transmission line. When access is desired to a selected channel, the LAM is placed in a powered bypass mode by external controls causing the throughput of the bit stream to be interrupted and bypassed. The bit stream is monitored, the selected channel is identified, and the incoming data in that channel is deleted. Locally generated data, such as test codes, are then inserted in lieu thereof and transmitted on the outgoing transmission line. Thus, the bit stream leaving the LAM represents the incoming bit stream with only the data of the selected channel changed. The remainder of the channels are unaffected by this operation. For use with duplex transmission lines, a LAM is installed in both the SEND and RECEIVE lines allowing loopback testing to be performed. The transition between throughput data and locally generated data or test codes is accomplished in accordance with this invention without degradation of the digital data stream, and the invention provides for proper line termination in both directions. The basic design of the LAM permits common circuitry to operate in conjunction with multiple duplex LAMs, each of which is installed in a duplex transmission line.

In its basic configuration, each half of a duplex LAM processes data in a given direction. One half of a LAM, viewed in the direction of data flow, may include a delay line, a first coupling circuit with two inputs and one output, and a data insertion circuit connected to one of the inputs of the second coupling circuit. Also included is a relay which permits the terminals of a specific one of multiple duplex LAMs to be controlled when the selected otherwise unpowered LAM is to be accessed by external common equipment. The relay also permits connection of the external common equipment to the transmission line upstream of the delay line for monitoring purposes.

The delay line functions most advantageously to provide delay of data signals in the passive or transparent mode, so that when the LAM is in the powered bypass mode, input data may be detected and output data regenerated without a time displacement error due to the transmit time of the data signals through the detection and regeneration circuits. The first coupling circuit is connected to the output ports of the delay line.

The passage of data between the first and second coupling circuits, which may consist of transformers, is controlled by first and second electronic switch means, which may be transistor-type switches, connected between the first and second coupling circuits. The first and second switching transistors, either bipolar or field effect, act as double-pole, signal-throw switches. When the LAM is unpowered, the first and second transistors by virtue of their characteristics when no external voltages are applied to their electrodes permit uninterrupted transmission of the digital data from the output of the first coupling circuit to the first input of the second coupling circuit. In the powered bypass mode with proper applied electrode voltages, the first and second transistors disconnect the output of the first coupling circuit from the first input of the second coupling circuit and terminate the transmission line in its characteristic impedance by connecting a resistor equal to such impedance at that point across the output of the first coupling circuit. The data insertion means has its output coupled to the second input of the second coupling circuit, and its input coupled to external common electronic circuitry for receiving inserted test data from such circuitry.

The first coupling means may be a transformer having an input or primary winding, and an output or secondary winding. The second coupling means may be a three-winding transformer with the first and second inputs being two primary windings, and the output a secondary winding. The data insertion means may be two bipolar transistors connected to the second primary of the second transformer.

It is therefore a principal object of the present invention to provide a line access device whereby an individual subscriber channel can be electrically accessed when the channel is one of a multiplicity of time division multiplexed channels in a digital bit stream without disturbing the data on other channels of the bit stream.

It is another object of the present invention to provide a line access module that involves a throughput mode and a bypass mode.

It is still another object of the present invention to provide a line access module that can be permanently installed in a digital data transmission line and that will be completely transparent to data signals on the line when the line access module is in its throughput mode.

It is yet another object of the present invention to provide a LAM connected in a digital data transmission line that will bypass incoming data signals on the line through external common electronics thence outgoing via the transmission line when the LAM is switched to its bypass mode, and without degradation of the data signals or disturbance to the line.

It is still yet another object of the present invention to provide a LAM that can be connected in a multiplicity of digital data transmission lines whereby all of such LAMs can utilize a single external common electronics section.

It is a further object of the present invention to provide a LAM whereby an individual subscriber channel of a TDM bit stream can be electrically accessed and test code data substituted for the subscriber's incoming data to allow the subscriber equipment to be rapidly and economically tested without disturbance to other subscribers on the same bit stream.

These and other objects, applications and advantages of the invention will become apparent from the following detailed description and from the accompanying drawings.

DESCRIPTION OF THE PREFERRED EMBODIMENT

L. Line Access Requirements

Figure 1:
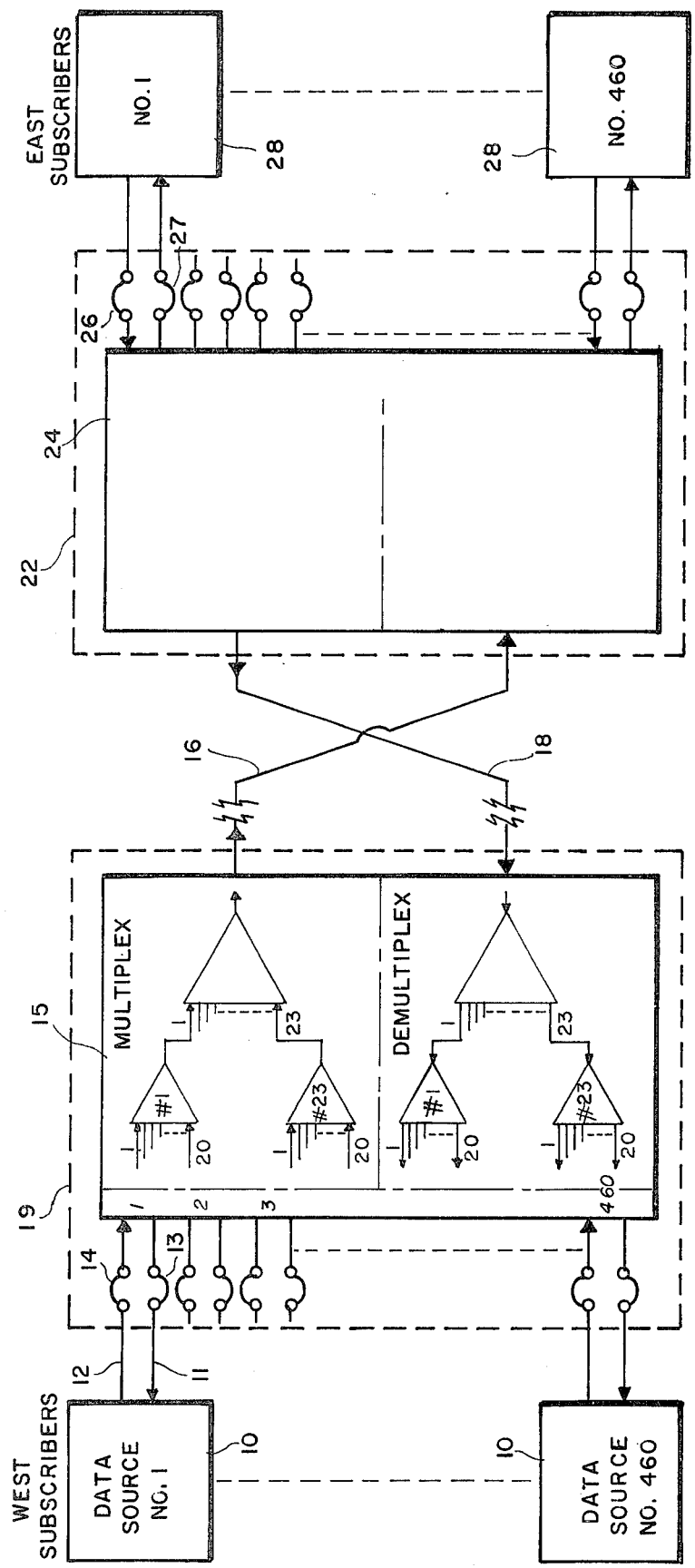
FIG. 1 is a simplified functional diagram of a typical prior art TDM data transmission system to which the present invention is applicable.

Before describing the preferred embodiment of the present line access module invention, a brief review of a typical time division multiplex (TDM) data transmission system to which the invention is applicable will be presented, and the requirements for line access will be developed. Referring to FIG. 1, one exemplary prior art TDM data transmission system is depicted in greatly simplified schematic form. For purposes of example, a T1 carrier system will be described although the same principles apply to other data rates and signal formats. A group of WEST subscribers #1 through #460 represent data sources 10 which generate data at 2.4 kilobits per second (kb/s) and are typically connected to WEST central office 19 by a 4-wire loop circuit having a SEND pair 12 and a RECEIVE pair 11. At central office 19 the SEND pair 12 has a series closed circuit test jack 14 and the RECEIVE pair 11 has a series closed circuit test jack 13.

The 4-wire loop circuit from each subscriber terminates at time division multiplexer 15 having a multiplex section and a demultiplex section as indicated. Each section comprises 23 submultiplexers (with each submultiplexer receiving data from a group of 20 subscribers), and a group multiplexer that combines the bit stream outputs from the 23 submultiplexers into a single high speed T1 bit stream outputting on transmission line 16. In the T1 system used as an example, the output data rate is 1.544 megabits per second which includes a multiplicity of overhead bits for defining synchronization and framing codes.

Figure 2:
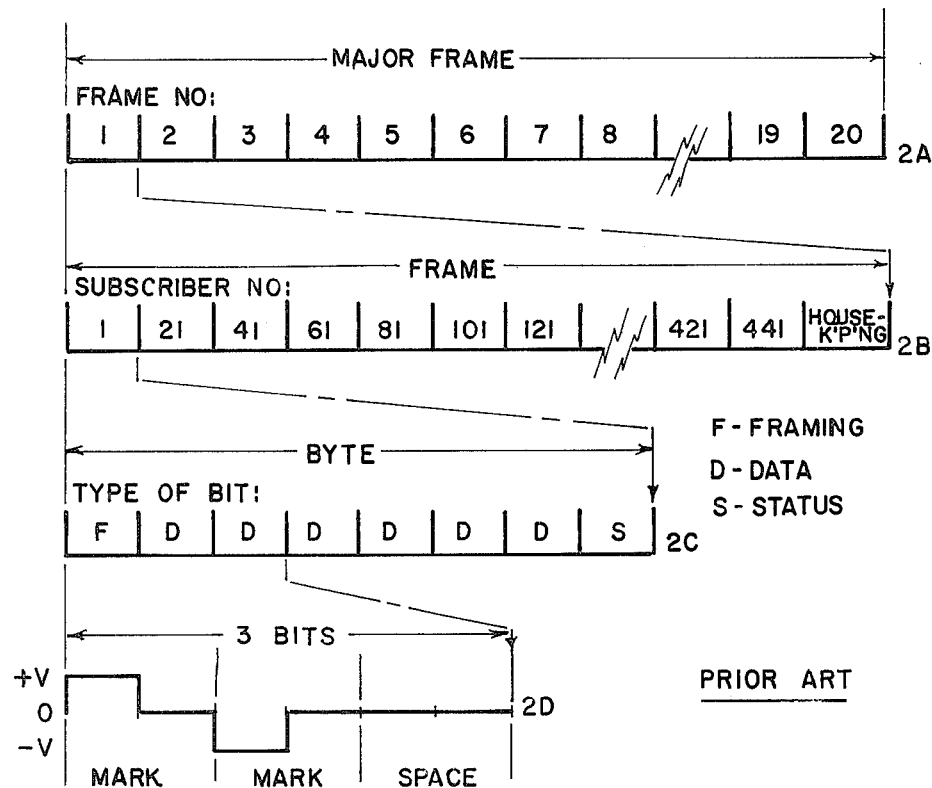
FIG. 2 is a TDM data format diagram applicable to the exemplary system of FIG. 1.

A prior art data format diagram is shown in FIG. 2 which is typical of the high speed data stream on transmission line 16 of FIG. 1. Line 2A represents a major frame having 20 frames with data signals from the 460 subscribers contained therein. Line 2B is an expansion of one frame of line 2A and comprises 24 bytes. The first 23 bytes of the frame carry an 8-bit byte from one of 23 subscribers and the 24th byte contains 8 housekeeping bits plus one framing bit. An 8-bit byte is more clearly seen in Line 2C in which one subscriber byte from line 2B is expanded, illustrating the basic bit structure thereof. The first bit is a framing pattern bit F followed by 6 data bits D, and a status bit S.

It is common to utilize bipolar data transmission having a 50% duty cycle for transmission of data in the system of FIG. 1. Line 2D illustrates a possible bipolar data pulse sequence for the first three bits of line 2C. Each bit is divided into a first and second half with the second half always having zero voltage. The first bit shown is a MARK, designated by a positive potential during the first half of the bit and a zero potential the second half; the second bit is also a MARK but is designated by a negative potential during the first half of the bit and a zero potential the second half; and the third bit is a SPACE designated by a zero potential for both halves of the bit. As may be understood, successive MARKS alternate between positive going and negative going half-pulses with the long term average being zero.

It is to be understood that a similar T1 bit stream is being generated at the EAST central office 22 by multiplexer 24 from the EAST subscriber group and being received over transmission line 18 by multiplexer 15 which conventionally demultiplexes the bit stream, thereby producing 460 2.4 kb/s data channels for distribution to the corresponding WEST subscriber 10; for example, subscriber #1 over RECEIVE pair 11.

In the exemplary prior art data system of FIG. 1, testing of an individual subscriber channel can only be performed at points in the system at which the desired channel is at the 2.4 kb/s level. For example, to test subscriber #1 channel through the transmission system, test jack 14 can be accessed manually and a test code transmitted in the EAST direction. The test code demultiplexed by multiplexer 24 can then be monitored manually at the EAST end at test jack 27; or jacks 26 and 27 can be patched together sending the test signal back in the WEST direction in a loopback mode. In this type of test, the signal is received at WEST end test jack 13 and is compared to the signal being sent via jack 14. As may be now understood, if it is desired or necessary to monitor the test signal at other points along the transmission line, this is only possible in the prior art if a complete multiplexer is available at such point to provide access to channel #1 at the 2.4 kb/s level.

In accordance with the present invention, a novel line access module (LAM) is provided that is permanently installable in the high speed data transmission path. When installed, the LAM has no adverse effect on the bit stream, yet allows monitoring of selected subscriber channels on occasions without requiring de-multiplexing. When monitoring the bit stream, the received data bytes in such channels can be deleted, and special test codes or patterns substituted therefor without degradation of the transmissions on the other channels. The inserted codes are usable both as test signals and as control signals to automatically set up loopback tests when the LAM is an element of a total test system as will be discussed in more detail hereinafter.

To access a high speed data line, the LAM must meet the following requirements:

1. The switching occurring when the transmission line is accessed by the LAM must be very rapid and must not cause transients in the bit stream.
2. The switching action in enabling the LAM must not cause discontinuities or reflections on the transmission lines.
3. The processing time in the monitoring and insertion circuits during a period of line access must not introduce time delays in the data stream.
4. The transmission signal levels in the transmission line must not be altered by the LAM circuit.
5. The deletion and insertion of data bytes must not cause bipolar polarity violations, or loss or gain of bit count.

2. Functional Description of the Line Access Module

Figure 3:
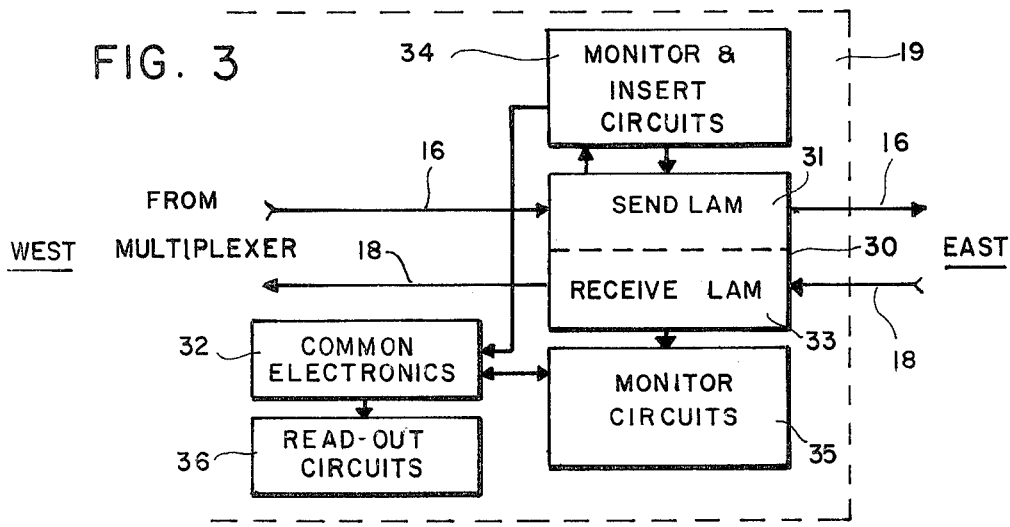
FIG. 3 is a simplified block diagram of a novel duplex LAM installed in a central office in accordance with the invention for the system of FIG. 1.

Turning now to FIG. 3, a simplified functional diagram is shown of a novel duplex LAM 30 in accordance with the invention installed in the exemplary data transmission system of FIG. 1. SEND line 16 which may be the output of a multiplexer 15 carries the 460 channel high speed bit stream representing the combined data from WEST subscriber data sources 10 and RECEIVE line 18 may carry the received high speed bit stream from multiplexer 24 representing the combined data from WEST subscriber data sources 28. Duplex LAM 30 is placed in series with transmission lines 16 and 18 and comprises a SEND half 31 and a RECEIVE half 33. Associated with duplex LAM 30 is the common electronics 32, monitor and insert circuits 34, monitor test circuits 35, and read-out circuits 36. These latter elements are conventional analog and logic circuits that serve to process, control and analyze the respective EAST and WEST data signals.

For example, common electronics 32 may include a computer programmed to recognize selected subscriber framing codes received via SEND LAM 31 and monitor/insert circuits 34. When a desired channel is recognized, the common electronics then may delete the incoming data bytes, and generate special test code bytes which are inserted in place of the deleted data and are transmitted in the easterly direction with all of the other subscriber data channels transmitted unmodified.

When a loopback test is being performed, monitor circuits 35 provide the test code bytes returning via the EAST receive line 18 to the common electronics for determination of error rate, or other parameters. Readout circuits 36 may include visual displays, print-outs, lamp indicators, go-no-go read-outs, or the like to alert operators to the test results. In accordance with this application of the LAM, tests may be preprogrammed and performed automatically, or be under manual control of an operator.

Figure 4:
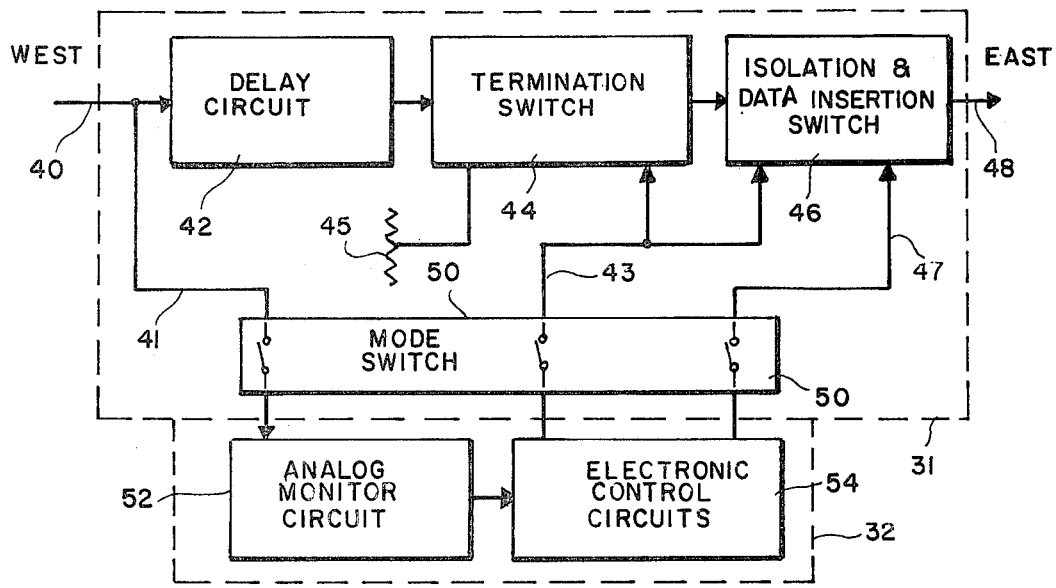
FIG. 4 is a simplified functional block diagram of a single LAM showing associated monitor and control circuits.

FIG. 4 is a simplified functional diagram of the ½ duplex SEND LAM 31 of FIG. 3 and will be used to describe the basic operation of the LAM. The LAM consists of a delay means which may be delay circuit 42, a switch means comprising a termination switch 44 and an isolation and data insertion switch 46, and a third switch means for powering switches 44 and 46 comprising mode switch 50. Mode switch 50 is also used as a LAM selection means when multiple lines are to be accessed as will be explained in more detail hereinafter. The LAM advantageously operates in three modes: an unpowered throughput mode; a powered throughput mode; and a powered bypass mode.

In the unpowered throughput mode, mode switch 50 is in its open or unoperated condition and no power is supplied to the active elements in the LAM. In this mode, LAM 31 is completely transparent to the data signals at input 40, and therefore these signals appear at output 48 unchanged except for a delay advantageously introduced by delay circuit 42. As previously mentioned, the LAM is permanently installed in a transmission line and the majority of the time is in the passive unpowered mode. Since the circuits are unpowered, no energy is required and the device operates with very high reliability.

In the powered throughput mode, mode switch 50 is closed in its operated condition applying voltages to the active elements of LAM 31 via line 43. In accordance with the invention, at the time of such operation, the polarities of the voltages applied to LAM 31 are such that the device remains transparent to data signals and the active devices draw no power. When it is desired to enter the bypass mode of LAM 31, the polarities of the applied voltages on line 43 are reversed placing LAM 31 in the powered bypass mode. The following description will assume that LAM 31 is operating in the powered bypass mode.

After closing of mode switch 50, line 41 carries the incoming data signals to analog monitor circuit 52. This circuit includes conventional digital circuits that regenerate the analog signal to logic levels and extracts timing therefrom. The regenerated signals are passed to electronic control circuits 54 that recognize the framing pattern of the selected subscriber channel to be tested, delete the received bytes, and substitute desired test code bytes. The modified bit stream appears on line 47 and, of course, consists of all of the incoming channel bytes regenerated and unmodified, except for the channel being tested, which now contains the test code bytes.

Returning to input 40, the data signals passing through delay circuit 42 appear at termination switch 44. However, at the time LAM 31 is placed in the powered bypass mode, switch 44 disconnects the output of delay circuit 42 and terminates this output with termination resistor 45 that matches the impedance at that point to prevent transients in accordance with requirement No. 3 above. Simultaneous with the termination switch action just described, isolation and data insertion switch 46 disconnects output 48 from delay circuit 42 and connects line 47 to output 48. As may be seen this action prevents the original input data signals from appearing at output 48. The modified bit stream from electronic control circuits 54 now appears at output 48 via line 47.

As may be recognized by those skilled in the art, the processing of the input bit stream by analog monitor circuit 52 and electronic control circuits 54 can cause a significant delay in the bit stream. If this delay were not corrected, there would be a loss in bit count integrity immediately after switching to the powered bypass mode with resulting loss of system synchronization. Most importantly, it is to obviate such problems that delay circuit 42 is provided and its delay is carefully selected to match the delay through the monitoring and control circuits. Thus, there is no change in timing between the two possible signal paths, and requirement No. 3 above is satisfied.

Switching from the powered throughput mode to the powered bypass mode is accomplished in accordance with the invention by fast-acting semiconductor devices responsive to the polarity of voltages on line 43 as generated in electronic control circuits 54 and, in accordance with the invention, at a specific time. As discussed in reference to FIG. 2, each bipolar bit is at zero potential in the second half of the bit. Circuits 54 advantageously synchronize switching from the throughput to the bypass mode to occur during such zero potential interval. As a result of the high switching speeds possible with well-known semi-conductor devices, switching can be accomplished without generation of undesirable transients thereby meeting requirement No. 1 above.

As indicated hereinabove, it is necessary that the MARK half-bit polarities alternate in the exemplary 50% duty cycle bipolar format. In inserting test codes in place of a subscriber-generated data byte in accordance with such application of the invention, it may be seen that the alternate polarity rule could be violated if, for example, the original byte contains an even number of MARKs and the test code byte contains an odd number of MARKs. In accordance with requirement No. 5 above, electronic control circuits 54 will automatically compensate for this occurrence as will be explained in detail hereinafter. Requirement No. 4 that the output data signal levels be unchanged is satisfied by the regeneration process in analog monitor circuit 52 described above.

3. Detailed Description of the Preferred Embodiment

Figure 5:
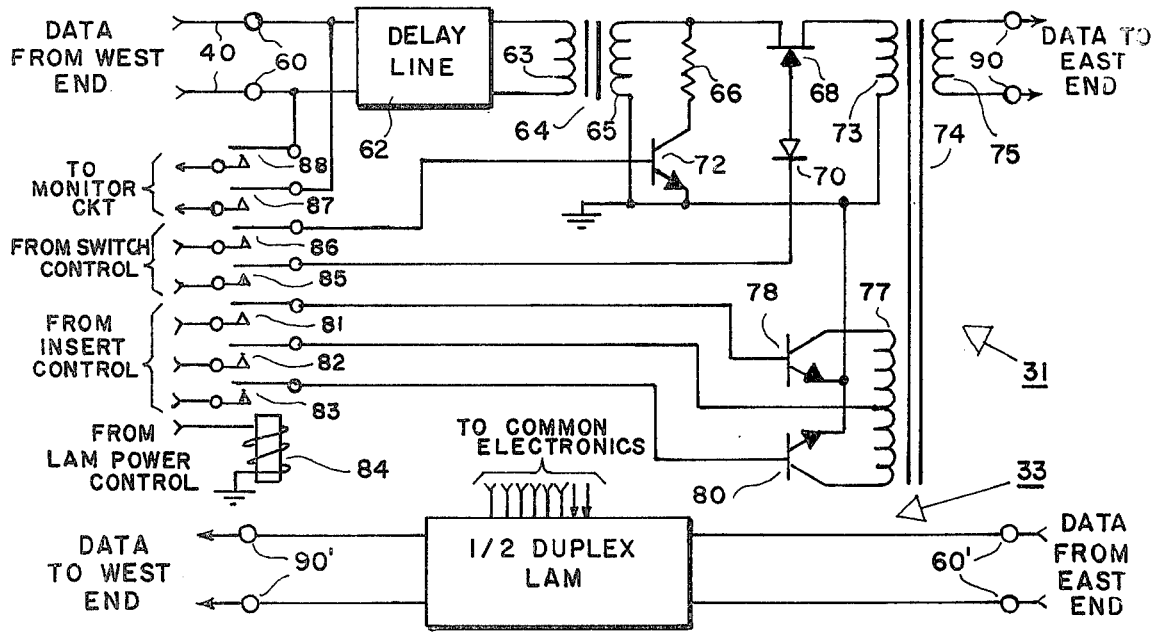
FIG. 5 is a schematic and block diagram of one embodiment of a duplex LAM in accordance with the present invention.

FIG. 5 is a schematic diagram of a line access module (LAM) installed in the SEND side of a four-wire transmission line carrying 50% duty cycle bipolar data. The transmission line carrying data from the WEST end is connected to input terminals 60, which are coupled through a balanced delay line 62 to the primary winding 63 of an isolation transformer 64. The balanced delay line 62 provides the time delay required to equalize the throughput path delay to equal the time required to process data in the common electronics, as described above. One end of the secondary winding 65 of transformer 64 is connected to the drain terminal of field effect transistor 68, and the source terminal is connected to one end of a first primary winding 73 of transformer 74.

The field effect transistor 68 provides means, as will be more fully described hereinafter, to either connect or disconnect the end of secondary winding 65 of first transformer 64 from the end of first primary winding 73 of the second transformer 74. The gate terminal of field effect transistor 68 is connected via diode 70 to the control electronics through a normally-open contact 85 of relay 84. The other end of the secondary winding 65 of transformer 64 is connected to a reference potential or ground. The other end of the first primary winding 73 of transformer 74 is also connected to ground. A termination resistor 66 is connected to the common junction between the end of the secondary winding 65 of transformer 64 and the source terminal of field effect transistor 68 and also to the collector of a bipolar NPN transistor 72. The emitter of transistor 72 is connected to ground.

Transformer 74 has a secondary primary winding 77 having a center tap connected to a source of positive voltage via relay contacts 82. One end of the second primary winding 77 of transformer 74 is connected through the collector to the emitter of transistor 78 to ground, and the other end of the second primary winding 77 is connected through the collector to emitter circuit of transistor 80 to ground. The bases of transistors 78 and 80 are connected to the common electronics through normally-open relay contacts 81 and 83 of relay 84. In addition, input terminals 60 are connected through normally-open contacts 87 and 88 of relay 84 to the common electronics.

When the transmission line to which the LAM is connected is to be accessed by the common electronics, relay 84 is energized which connects the aforementioned circuit elements to the common electronics which subsequently performs the data monitoring, and controls the LAM to either throughput regenerated original input data, or to insert regenerated and modified input data. The secondary winding 75 of transformer 74 is connected through output terminals 90 to deliver data to the EAST end of the transmission line. The RECEIVE LAM is illustrated only generally as a block 33 since the circuitry is identical to that half just described and functions to transmit data from the EAST end to the WEST end of the transmission line.

The operation of the LAM as illustrated in FIG. 5 will now be described in more detail. In the unpowered throughput state, relay 84 is in its non-operated condition and the various circuit elements are isolated from the common electronics by the normally-open contacts of relay 84. The relay contacts 87 and 88 are preferably of the mercury wetted type to assure proper operation with load currents in the microampere range, since the monitor circuit utilized in the common electronics is usually of a high input impedance. In the unpowered throughput state the LAM operates in the throughput mode passing data from WEST to EAST as follows. Since the base of transistor 72 is open, and consequently non-conducting between emitter and collector, resistor 66 is isolated from ground by such OFF condition. Transistor 68 is an N-channel junction type field effect transistor which exhibits a low ohmic resistance path between the source and drain terminals with the gate terminal open as in the normal unpowered throughput state being described. Transistor 68 thus acts as a bar of conductive silicon connecting the end of winding 65 of transformer 64 to the end of winding 73 of transformer 74. Data is thus passed through delay line 62, and transformer 64 through the source to drain terminal of transistor 68 and through transformer 74 to the EAST end of the transmission line. In the unpowered throughput mode, transistors 78 and 80 are in the OFF or open circuit condition since their respective base leads are open and the center tap of second primary winding 77 of transformer 74 is also open, completely isolating the insertion circuit from the common electronics to insure against degradation of the throughput data due to stray signals.

When the LAM is to be used to access the data stream for example for test purposes on a specific transmission line, relay 84 of the LAM is energized connecting the various circuit elements to the common electronics. After the relay contacts have closed, contacts 81 through 86 which previously have been open-circuited and now connected to potentials which maintain transistors 72, 78 and 80 in the OFF Condition and transistor 68 in the normally ON condition such that the resistance between the drain and source terminals in negligible. The conditions noted above maintain the LAM in the powered throughput mode. The powered throughput mode is provided to prevent degradation in data during the period of relay contact operation or in case of contact bounce. Operation of relay 84 also closes contacts 87 and 88 connecting input 60 to a data detection circuit within the common electronics permitting synchronization and detection of the data stream to be obtained by the common electronics.

The period following closure of relay 84 marks the onset of the powered throughput and bypass modes. During this period, termination control transistor 72 is controlled by the potential on its base, and isolation transistor 68 is controlled by the potential on its gate. Data insert transistors 78 and 80 are likewise controlled by potentials on their bases. The potentials applied immediately following closing of relay 84 maintain the LAM in the throughput mode as follows. A negative potential is applied to the base of transistor 72 and maintains that transistor in the OFF condition such that termination resistor 66 is not connected across the secondary winding 65 of first transformer 64. A positive potential is applied to the gate of transistor 68 which, although blocked by diode 70, maintains the status of transistor 68 in the ON condition since transistor 68 may be turned OFF only by a negative potential applied to the gate. Data insert and regeneration transistors 78 and 80 are maintained in the OFF condition by negative potentials applied to their bases.

In conjunction with the data detection and synchronization process in the common electronics, the amplitude of the received data is measured, and a suitable positive voltage V+ is applied to the center tap of second primary winding 77 via relay contact 82 such that the amplitude of the data pulses generated from winding 77 when in the bypass mode will conform to the amplitude of the throughput pulses.

The powered bypass mode is entered under control of the common electronics by simultaneous polarity reversal of the potentials of switch transistors 72 and 68. The powered bypass mode is advantageously entered only during a period of zero energy, which exists following a positive-going or negative-going initial half bit of a MARK of the bipolar data, as illustrated in Line 2D of FIG. 2. The common electronics monitors the bit stream and initiates the polarity reversal following a MARK. When the powered bypass mode is thus entered, subsequent emergent pulses sent to the EAST end of the line are generated by positive drive potential to the bases of data insert transistors 78 and 80. A positive data MARK is generated by turn ON of transistor 78 and a negative pulse is generated by turn ON of transistor 80. During the powered bypass mode, all data received at the WEST termination of the LAM is thus regenerated in the second primary winding 77 of the second transformer 74 except for selected groups of data pertaining to a specific customer for which a test code is substituted and inserted in lieu of the original data. During the powered bypass mode the data to the other customers is transmitted without change.

As noted above, in the powered bypass mode, during insertion of test codes to be transmitted toward the eastern termination of the transmission line, the other half-section 33 of the duplex LAM monitors the return transmission for the properly elicited response from the customer channel under test. A relay similar in all respects to that in the first half-section 31 connects data being received from the EAST to the common electronics as indicated. The potentials applied to the second half-section 33 of the duplex LAM are such as to maintain that section in the powered throughput mode.

When transistor 72 of half-section 31 is turned ON in the powered bypass mode, the WEST end of the transmission line connected to terminals 60 is properly terminated by resistor 66 which has a value equal to the transformed characteristic impedance of the transmission line as viewed from the secondary 65 of transformer 64 thus preventing reflections or disturbances on the line. Transistor 68 is maintained in the OFF or open circuit condition thereby isolating transformer 74 from the transmission line connected to the input terminals 60. Data is now transmitted via transformer 74 by the operation of transistors 78 and 80 and the insert control of the common electronics. In conjunction with the common electronics, the LAM according to the invention allows locally generated data MARKs to conform in amplitude, time displacement and polarity balance to the appearance of data MARKs in the throughput mode. This conformity between the throughput and inserted data is required for proper operation of the line terminating receive circuits.

When the powered bypass mode is terminated at the conclusion of a test, the polarity of potentials being applied to switch control transistors 72 and 68 is reversed during a zero-energy period which connects the LAM in the powered throughput mode, similar to its condition in the unpowered throughput state. The throughput mode is established since with a negative potential on transistor 72, transistor 72 is open circuited and no longer connects resistor 66 across the secondary winding of the first transformer 64 and, since a positive potential is now applied to diode 70, field effect transistor 68 now exhibits a low ohmic resistance between the secondary of the first transformer to the first primary of the second transformer. When the active powered mode is terminated, base control signals to regenerating transistors 78 and 80 are maintained at a negative potential maintaining zero current in the second primary winding of the second transformer.

Termination of the powered mode is complete when relay 34 is de-energized returning the LAM to the unpowered throughput mode with the data signal being of course throughput without modification.

Figure 6:
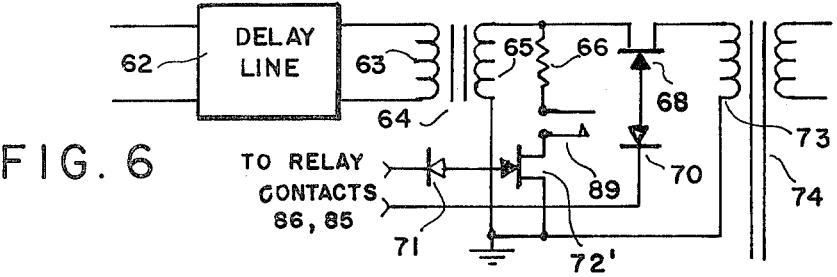
FIG. 6 is a partial schematic diagram of a single LAM according to another embodiment of the present invention.

FIG. 6 shows a partial schematic diagram of another embodiment of the LAM wherein the bipolar transistor 72 of FIG. 5 is replaced by a field effect transistor 72' having its drain and source connected between the resistor 66 and ground, respectively. The gate of field effect transistor 72' is connected through a diode 71. In addition, a normally open contact 89 of relay 84 is inserted between the resistor 66 and the source terminal of transistor 72'. Thus, in the unpowered mode, the connection of the resistor 66 across the secondary winding 65 is maintained in an open circuit condition. It will be understood that the embodiment illustrated in FIG. 6 is in all other respects identical to that shown in FIG. 5 and operates in the same manner.

In each of the embodiments shown in FIGS. 5 and 6, disengagement of the LAM, that is, the return from the powered mode to the bypass powered throughput mode, the reversal of potentials is caused to occur during the zero potential period following a MARK in the data stream which, for bipolar data transmission, is a period of zero energy. When the LAM is returned to the unpowered mode, throughput data passes through the LAM as before, and the transistors 78 and 80 are not driven. The primary advantage of using field effect transistors in place of bipolar transistors for switching is that the switching rates of field effect transistors are faster, thereby making the LAM applicable to systems using higher data rates. On the other hand, specific bipolar transistor types are available having higher reverse breakdown voltage characteristics and may be required in applications where large signal voltages are being processed. While the description of the several embodiments of the LAM according to the invention have been in terms of processing bipolar data, it should be noted that the rapid line termination and isolation afforded by the LAM permits its use for data formats of the nonreturn to zero type without causing excessive discontinuities by carefully timing the switching to occur during bit transition times.

Primarily, the LAM operates upon digital data in real time, while that data is in the process of traveling down a transmission line toward its destination. The LAM is installed in the same manner as a "pad" in the transmission line. In the unpowered throughput mode, the LAM is transparent to the data stream. It is to be understood that the data content of the transmission line cable is an analog voltage and that the LAM and common electronics is operating directly on this analog signal as opposed to logic level signals. In the powered bypass state, in conjunction with common electronics that can accommodate a plurality of LAMs (and as many high speed duplex transmission lines), the LAM permits the alteration of any one selected bit or any selected group of bits or all bits between the time the data entered the WEST end of the LAM and left the EAST end of the LAM. As previously mentioned, the above is accomplished in such a manner that the receiving equipment at the termination end of the transmission line does not experience any transients.

4. Specific Applications

Having described in detail the implementation and operation of the preferred embodiment of the line access module, several specific applications of the LAM will be examined.

Figure 7:
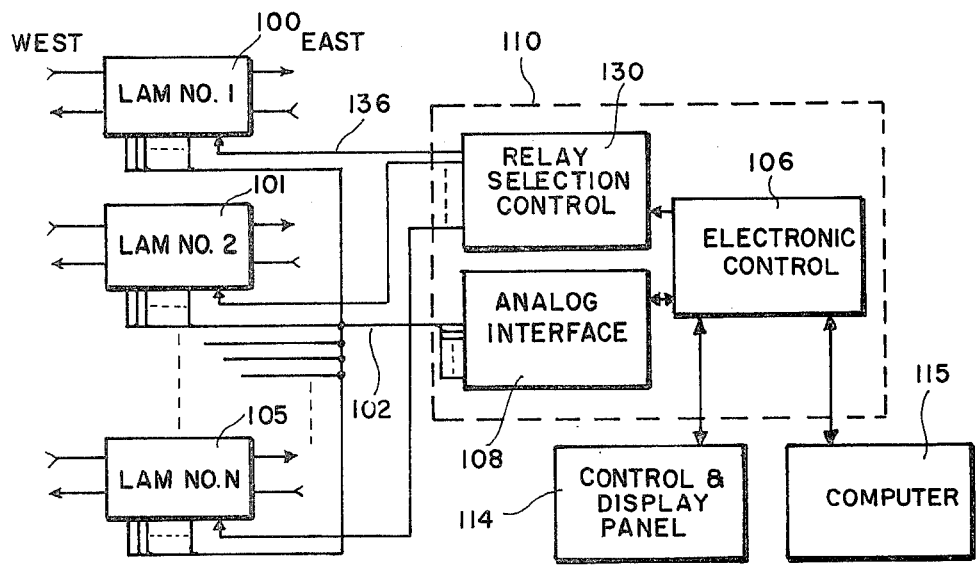
FIG. 7 is a block diagram showing the application of multiple LAMs with a single common electronics section to a digital data transmission system having a multiplicity of transmission lines.

FIG. 7 shows a simplified functional diagram of a multiple duplex LAM installed and the associated electronics known as a Bit Access Test System (BATS). The installation is made at a central office where a large number of duplex transmission lines to and from diverse points are present. Each LAM is permanently installed in its duplex line. Three duplex LAMs 100, 101, and 105 are installed in FIG. 7, but it will be understood by those skilled in the art that any desired number of duplex LAMs may be installed depending on specific requirements. In the BATS application illustrated, a specific duplex LAM can be selected and powered by the common electronics. Then, to test a subscriber on a particular transmission line, a test code will be injected via one half-section of the duplex LAM associated with that line, and the looped-back response from that subscriber validated by monitoring the data at the input side of the other half-section of the selected duplex LAM.

Signal and control lines from each of the LAMs are supplied over bus 102 to the common electronics 110. The common electronics 110 which interface with the duplex LAMs consist essentially of those analog circuits 108 which interface with the near (WEST to EAST) end test half of the duplex LAM and those which interface with the far (EAST to WEST) end test half of a duplex LAM, with the greatest portion of the common electronics 110 being those electronic control circuits 106 which operate on the contents of the data as extracted from the analog interface 108. Also included in the common electronics 110 is relay selection control 130. Relay selection control 130 is connected to each LAM via a line such as line 136 connected to LAM 100, and serves to close relay 84 (FIG. 5) in only the selected duplex LAM, with all of the other LAMs remaining in the unpowered throughput mode. The electronic control circuits 106, under manual or computer control, control the selection of a specific transmission line by means of its LAM via control 130 and also control the sequence of operation of the analog interface circuits with respect to both sides of the LAM. Computer control is illustrated by the computer 115 connected to the electronic control circuits 106. Also, a conventional control and display panel 114 may be connected to the electronic control circuits 106.

Figure 8:
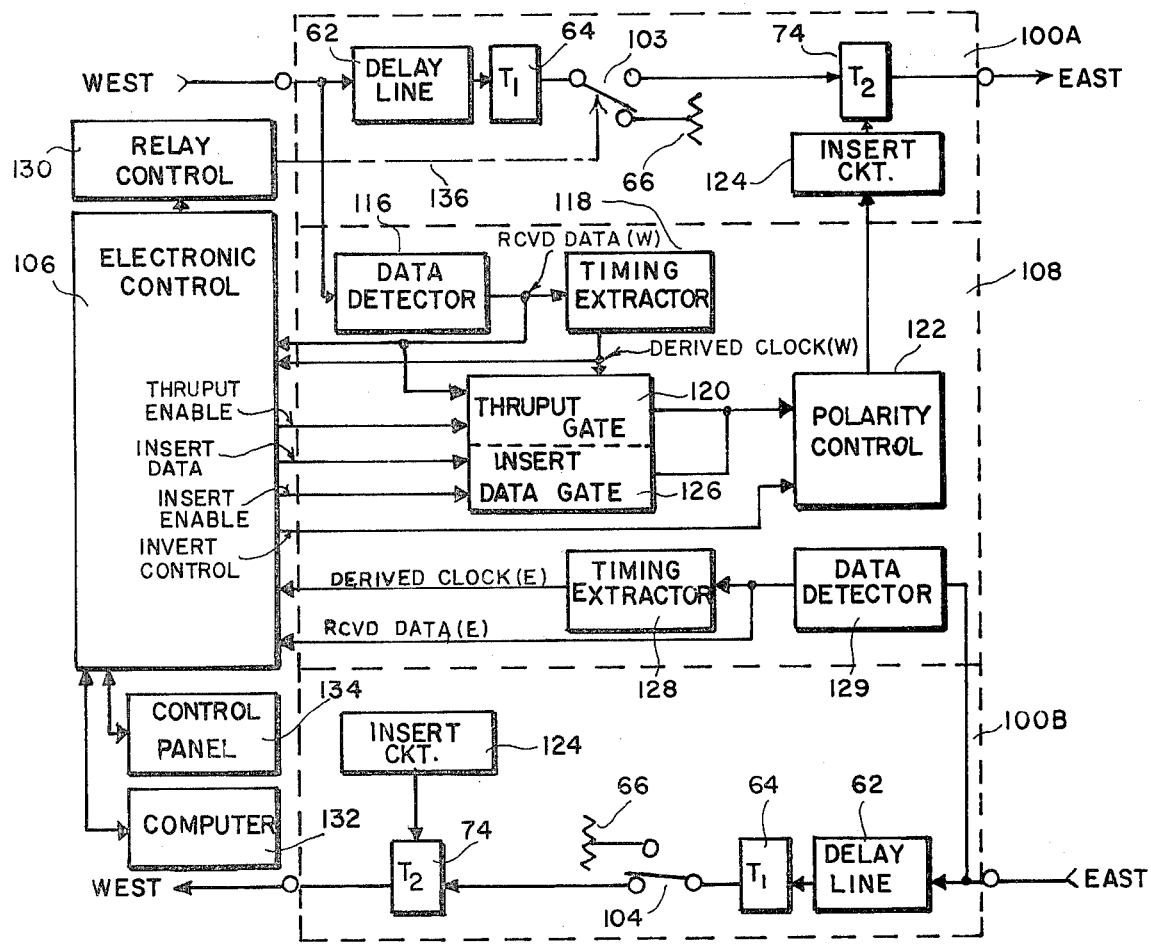
FIG. 8 is a functional block diagram of the common electronics section as used with a duplex LAM for performing testing in accordance with the invention.

FIG. 8 represents a simplified functional diagram of the selected LAM of FIG. 7 operating in conjunction with the analog interface circuits 108 and the electronic control circuits 106 of common electronics 110. This figure when considered with the waveforms of FIG. 9 will provide a more detailed illustration of the BATS application of the LAM. The LAM is illustrated as in FIG. 8 comprising a near end (WEST to EAST) test half 100A and a far end (EAST to WEST) test half 100B. The switches 103 and 104 in the LAM halves 100A and 100B, respectively, represent the equivalent operation of the switching transistors of the LAM as specifically described with respect to FIGS. 5 and 6 of the drawings. As shown, the near end test half 100A is in the test mode, while the far end test half 100B is in the monitor mode. Data input to the near half 100A from the EAST is detected by data detector 116 and supplies an output to the timing extractor 118. Timing extractor 118 then derives clock pulses synchronized with the incoming data. The output of the data detector 116 is also supplied to the electronic control circuits 106 which determine the byte location of the specific subscriber under test. The data at the WEST input of LAM 100A may have an analog waveform as shown on line 9A of FIG. 9 and would appear at the output as shown on line 9B. Data detector 116 amplifies, slices, and rectifies the data signal as in line 9C. Timing extractor 118 samples the pulse at the center of each half-bit and outputs the derived clock signal as shown on line 9D. The bit duration is a variable, depending on the number of subscribers and their data rates. For simplicity of explanation, it will be assumed that the half-bit duration is 330 nanoseconds (ns) and the sampling point is 165 ns from the beginning of the half-bit as shown.

Figure 9:
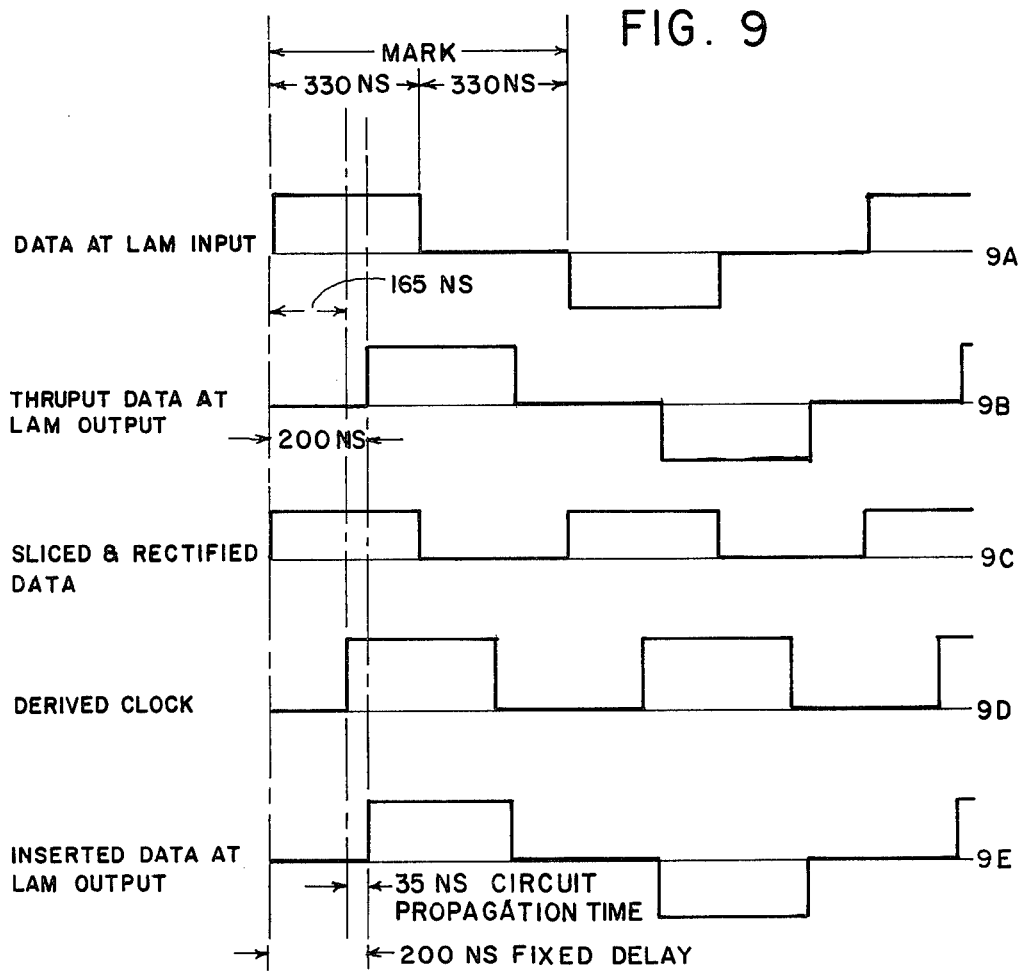
FIG. 9 is a waveform and timing diagram relating to the configuration of the test system of FIG. 8.

The data output of the data detector 116 (FIG. 8) represents one input to throughput data gate 120. This gate is enabled by a control signal from electronic control 106, timed by the SEND derived clock signal. Incoming data signals that are to be throughput without modification are passed by gate 120 via polarity control 122 and insert circuit 124, as shown in line 9E. FIG. 9, in synchronization with the clock signals plus a delay of 35 ns which represents the propagation time through the analog interface circuits 108. The insertion circuit 124 acts to regenerate the outgoing data signals as shown and explained previously. It is pertinent to note at this point that the total delay through circuits 108 is 200, ns and is identical to the delay through the delay line 62 of the LAM when in its unpowered throughput or non-selected mode. Thus, delay line 62 is selected to be 200 ns for this exemplary application.

When electronic control 106 locates the subscriber byte for the channel to be tested, a test code byte is generated and sent to insert data gate 126 along with an insert enable signal. Throughput data gate is disabled blocking the subscriber-generated byte, allowing the test code byte to appear at the output of LAM 100A via polarity control 122, insert circuit 124, and transformer 74.

The test code is received by the subscriber at the EAST end, which then causes a data loopback to occur causing the same data (the test code) to be sent toward the WEST end subscriber. The composite mulitplexed data passes through the far end test half 100B where the presence of this test code is detected and then validated by the electronic control circuits 106. The data detector 129 and timing extractor 128 operate on the data in the same manner as data detector 116 and timing extractor 118 except that the data is throughput and not regenerated. For a near end test, the operation as described above is reversed, and the test code is inserted via the far end half 100B and monitored in near end half 100A.

The essential aspect of the monitor circuit comprising, for example, the data detector 116 and the timing extractor 118, is that it presents a non-loading, high impedance appearance since it is bridged across the transmission line. The data detector 116 may employ a threshold or slicing voltage equal to one-half of the peak signal to provide equal margin against error in detecting a MARK or SPACE. A positive threshold is employed for a "positive" MARK, and a negative threshold is employed for a "negative" MARK. This slicing operation is followed by the center sampling process in which the positive edge of the clock, as previously discussed, is designed to be located at the midpoint of the received MARK, and is used to retime the data for regeneration in throughput gate 120. The electronic control 106 also retains the sense or polarity of the last pulse sampled by the timing extractor 118, for reasons which will be explained hereinafter.

The electronic control circuits 106 operate on the received and detected data and timing, obtained from the timing extractor 118, and is thus able to synchronize with the frame and the byte pattern of the data stream. An important aspect of the control afforded by the analog interface is the ability to prevent bipolar violations following insertion of data within an 8-bit subscriber byte. To prevent such bipolar violations of the regenerated pulses leaving the LAM, the LAM polarity control 122 operates on the sequence of MARKs of both received and inserted data. Thus, following insertion of test code MARKs in a subscriber byte, the MARKs of the subsequent bytes may be transmitted in the opposite sense (or polarity) to that which was received and that which would be throughput if a return to the throughput mode were made. Under the control of the control circuits 106 operating on the sense or polarity of data received from the analog interface, if a decision is made to exit the test mode, then the number of MARKs in the last subscriber byte prior to such exit is arbitrarily modified so that subsequent byte data will be transmitted without inversion prior to actual exit from the test mode. This correction, if required, is made by action of polarity control 122 and is initiated by invert control signal from electronic control 106. The last bit of the last subscriber byte is changed to its complement thereby preventing the undesired polarity violation. It is to be understood, of course, that an error will appear in such byte; however, test on a subscriber are normally made when such subscriber is on idle condition and the reversed bit would be in an idle code and of no consequence. Certainly, no error is caused in the data of other non-idle subscribers. Termination of the test mode is then accomplished by the switch control which returns the near half 100A to its throughput mode by operating switch 103 through relay control 130.

The electronic control 106 may utilize a computer 132 to program various test routines. Computer 132 may be a full size computer, a mini-computer or a microprocessor. Control and display panel 134 provides means for manual initiation of tests and read out of various parameters obtained from test as previously described.

Figure 10:
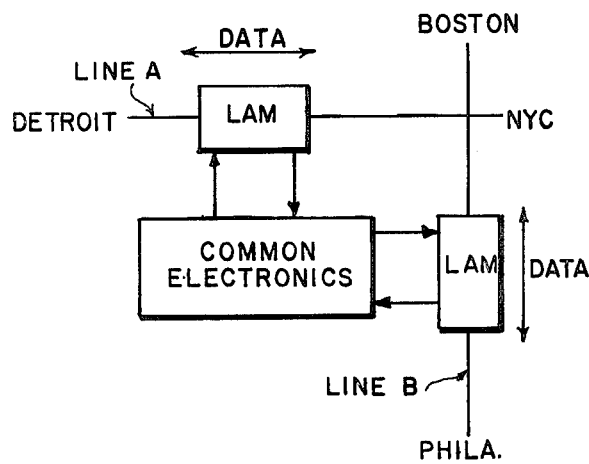
FIG. 10 is a block diagram illustrating the application of a LAM to provide data drop and insert between high speed transmission lines in accordance with the invention.
Figure 11:
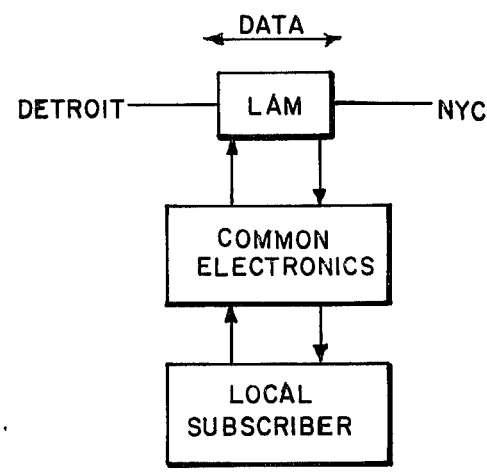
FIG. 11 is a block diagram illustrating the application of a LAM to provide local subscriber data drop and insert in accordance with the invention.

A much greater dimension to the possible application of the line access module according to the invention is attained when the LAM is considered as a data transfer device. Such an application is illustrated, for example, in FIG. 10. Segments of the data on transmission line A between New York City and Detroit can be transferred to transmission line B between Boston and Philadelphia, via the LAMs associated with each line. In another application illustrated in FIG. 11, greater flexibility at the local subscriber level is achieved when the LAM is utilized to drop and insert specific subscriber data from the high speed line and distribute it to the subscriber loop via flexible logic circuitry not "tied" to the hard wired distribution of the central office.

It will be apparent that the embodiments described hereinabove are only exemplary, and that various modifications can be made in the construction and arrangement without departing from the scope of the invention.

As may also be apparent, the line access module described hereinabove provides a convenient method for accessing an individual subscriber channel in a digital data transmission line. For example, the module performs the steps of delaying the throughput of data signal flowing through the line at the point of installation of the device during non-accessed periods; interrupting the throughput of data signals when access is required and terminating the interrupted incoming portion of the line; simultaneously monitoring the undelayed signal from the incoming portion of the transmission line; identifying the selected subscriber channel in the monitored data signals; deleting the data on the selected channel; inserting locally generated codes or test signals; and retransmitting the non-deleted portions of the incoming monitored data signals and the inserted signals on the outgoing portion of the transmission line.

I claim:

1. A digital data transmission line access device having a transparent mode and a bypass mode comprising:
   input and output terminals;
   delay means connected to said input terminals, said delay means operative only in said transparent mode to delay incoming data signals present at said input terminals wherein such delayed data signals appear at said output;
   electronic switch means electrically connected to said delay means for passing such delayed signals to said output terminals when in said transparent mode, said switch means terminating said delay means and inhibiting passage of such delayed signals when in said bypass mode;
   data insertion means electrically connected to said output terminal for passing externally generated data signals to said output terminal only when in said bypass mode;
   data signal monitoring and processing means connected to said input for monitoring said incoming data signals, and for modifying a selected portion of said incoming data signals to produce externally generated data signals, said monitoring and processing means electrically connected to said data insertion means to pass said externally generated data signals to said output terminal via said data insertion means when in said bypass mode; and
   control means electrically connected to said electronic switch means and said data insertion means, said control means for selectively causing said electronic switch means to maintain either a first state representative of said transparent mode or a second state representative of said bypass mode, and controlling said data insertion means to pass such externally generated data signals only in said bypass mode;
   whereby said line access device passes said incoming data signals from said input terminal to said output terminal without modification when in said transparent mode, and passes such externally-generated data signals from said data insertion means to said output terminal when in said bypass mode.

2. The line access device as defined in claim 1 which further comprises:
   first coupling means connected between said delay means and said electronic switch means;
   second coupling means connected to said output terminal, said second coupling means having a first and second input, said first input connected to said electronic switch means, and said second input connected to said data insertion means.

3. The line access device as defined in claim 2 in which:
   said first coupling means is a transformer having primary and secondary windings with said primary winding connected to said delay means; and
   said second coupling means is a transformer having two primary windings and a secondary winding, said secondary winding connected to said output terminal.

4. The line access device as defined in claim 3 in which: said delay means is a balanced delay line; and said electronic switch means comprises a plurality of semiconductor switches .

5. The line access device as defined in claim 4 in which:
   said plurality of semiconductor switches includes a bipolar transistor having its collector-emitter circuit in series with a terminating resistor with the series combination connected to said secondary of said first transformer, said transistor having a base electrically connected to said control means, whereby said terminating resistor is selected to terminate said transmission line in its characteristic impedance when said electronic switch is in its said second state ; and a field effect transistor having drain, source, and gate electrodes, said drain-source circuit being connected between said secondary winding of said first transformer and a first primary winding of said second transformer, and having said gate electrode electrically connected to said control means.

6. The line access device as defined in claim 5 in which:
   said data insertion means includes a transistor driver, said transistor driver electrically connected to said second primary of said second transformer and said transistor driver is energized when said electronic means is in its said second state.

7. The line access device of claim 6 in which said control means is a relay having a plurality of normally open contacts, said monitoring and signal processing means being connected to said input terminal, to said transistor base, and to said transistor gate electrode, and said transistor driver being connected to operative potentials by respective ones of said normally open contacts, said relay controllable to cause said line access device to be transparent to incoming data when said relay is unoperated and to be in said bypass mode when said relay is operated.

8. A device installable in a series relationship in a transmission line carrying a digital time division multiplex data bit stream for accessing individual subscriber channels within such bit stream, which device has a transparent mode and a bypass mode, said device comprising:
   input terminals for receiving incoming data signals;
   output terminals for outputting data signals;
   switch means having an operated state and an unoperated state, said switch means being connected in an electrical path between said input terminals and said output terminals and providing in a transparent mode, a through-put path for incoming data signals when said switch means is in said unoperated state, and providing in a bypass mode, an interruption of said throughput path when said switch means is in said operated state;
   delay means disposed in said electrical path between said input terminals and said switch means, said delay means for delaying the passage of such incoming data signals through said throughput path only when said switch means is in said unoperated state,
   said switch means connected to resistively terminate said delay means when said switch means is in said operated state
   monitoring means electrically connected to said input terminals for passing incoming data signals to external signal processing circuits only when said switch means is in said operated state; and
   data insertion means electrically connected to said output terminals and to said external signal processing circuits for receiving outgoing data signals from said external signal processing circuits, said data insertion means passing said outgoing data signals to said output terminals when said switch means is in said operated state wherein at least some portions of said outgoing data signals are identical to at least some portions of said incoming data signals, said delay means having a selected delay time to cause the transit time of incoming data signals through said throughput path when said switch means is in said unoperated state to be exactly equal to the transit time of said identical portions of incoming data signals through said monitoring means, said external signal processing circuits, and said data insertion means when said switch means is in said operated state.

9. A device as defined in claim 8 installable in said transmission line which includes an outgoing line and an incoming line further comprising an additional, identical device, said devices arranged to permit access to individual subscriber channels in the outgoing direction and in the incoming direction.

10. A line access module for installation in a digital data transmission line, comprising:
a first transformer having primary and secondary windings, said primary winding connected to an incoming transmission line;
a balanced delay line connected between said incoming transmission line and said primary winding of said first transformer;
monitoring means connected to said incoming transmission line for monitoring incoming digital data signals;
a second transformer having first and second primary windings and a secondary winding, said secondary winding being connected to an outgoing transmission line to provide output digital data signals;
switching means, including a termination impedance, connected between said secondary winding of said first transformer and said first primary winding of said second transformer for selectively connecting said secondary winding of said first transformer to either said first primary winding of said second transformer or said termination impedance;
data insert means connected to the second primary winding of said second transformer for inserting digital signals when said secondary winding of said first transformer is connected to said terminating impedance;
data processing means connected between said monitoring means and said data insert means for generating external data and substituting such external data for selected portions of incoming digital data signals producing a modified digital data signal; and
control relay means connected to said switching means and said data insert means for selectively controlling latter means to insert such modified digital data signal into said second primary winding only when said secondary winding of said first transformer is connected to said terminating impedance, said delay line having a selected delay to equalize the transit time of unmodified incoming digital data signals through said module with the transit time of such modified digital data signals through said module.

11. A line access module as recited in claim 10 wherein said termination impedance has the transformed characteristic impedance of said transmission line as viewed from the secondary winding of said first transformer and is connected with one terminal to one end of the secondary winding of said first transformer; said switching means further comprising:

a first semiconductor switch connected between the other terminal of said terminating impedance and the other end of the secondary winding of said first transformer; and
a second semiconductor switch connected between one end of the secondary winding of said first transformer and one end of the first primary winding of said second transformer.

12. A line access module as recited in claim 11 wherein said first semiconductor switch is a bipolar transistor having base, collector and emitter electrodes, said transistor being connected with its collector/emitter circuit between said termination impedance and said other end of the secondary winding of said first transformer.

13. A line access module as recited in claim 12 wherein said second semiconductor switch is a field effect transistor having drain, source and gate electrodes, said transistor being connected with its drain/source circuit between said one end of the secondary winding of said first transformer and said one end of the first primary winding of said second transformer.

14. A line access module as recited in claim 11 wherein said first semiconductor switch is a field effect transistor having drain, source and gate electrodes, said transistor being connected with its drain/source circuit between said termination impedance and said other end of the secondary winding of said first transformer.

15. A line access module as recited in claim 10 for use in a duplex transmission line further comprising an additional, identical line access module but permitting data flow in the opposite direction.

16. A line access module as recited in claim 10 further comprising a relay having a plurality of normally open contacts, said monitoring means being connected to said switching means and said insert control means being connected to said data insert means by respective ones of said normally open contacts, said relay being controlled by said signal processing and control means whereby the line access module is unpowered and transparent to incoming data when said relay is unenergized.

17. A method for selectively accessing a digital data transmission line without degradation or interruption of data signals on the transmission lines comprising the steps of:
delaying the throughput of data signals at a selected point in said transmission line during nonaccessed periods;
interrupting the throughput of data signals at said point and terminating the interrupted incoming portion of the transmission line;
simultaneously monitoring undelayed data signals from the incoming portion of the transmission line;
processing at least some portions of such monitored data signals; and
retransmitting processed and unprocessed portions of such monitored data signals on the outgoing portion of the transmission line;
wherein the delay in the first step is equal to time of monitoring, processing, and retransmitting such data signals.

18. The method as defined in claim 17 in which said step of processing at least some portions of such monitored data signals comprises:
identifying selected portions of the monitored data signal bit stream;
deleting such selected portions; and
inserting locally-generated data in place of such deleted portions.

* * * * *